United States Patent
Schultz et al.

(10) Patent No.: US 8,339,444 B2
(45) Date of Patent: Dec. 25, 2012

(54) AUTOSTEREOSCOPIC LIQUID CRYSTAL DISPLAY APPARATUS

(75) Inventors: John C. Schultz, Afton, MN (US); William J. Bryan, Mahtomedi, MN (US); Alan G. Hulme-Lowe, Woodbury, MN (US); Michael J. Sykora, Deer Park, WI (US); Billy L. Weaver, Eagan, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 1660 days.

(21) Appl. No.: 11/697,870

(22) Filed: Apr. 9, 2007

(65) Prior Publication Data

US 2008/0246837 A1    Oct. 9, 2008

(51) Int. Cl.
*H04N 13/04* (2006.01)
*H04N 9/47* (2006.01)

(52) U.S. Cl. ............ 348/54; 345/419; 349/15

(58) Field of Classification Search ........ 349/5, 177; 345/96, 419, 629; 600/437; 359/475; 348/51, 348/39, 53, 58

See application file for complete search history.

(56) References Cited

U.S. PATENT DOCUMENTS

| | | | |
|---|---|---|---|
| 5,714,997 A * | 2/1998 | Anderson | 348/39 |
| 5,943,166 A * | 8/1999 | Hoshi et al. | 359/475 |
| 6,816,142 B2 | 11/2004 | Oda et al. | |
| 6,825,821 B2 | 11/2004 | Oda et al. | |
| 7,015,887 B2 | 3/2006 | Oda et al. | |
| 7,057,638 B1 | 6/2006 | Yuuki et al. | |
| 7,165,959 B2 | 1/2007 | Humlicek et al. | |
| 7,530,721 B2 | 5/2009 | Mi et al. | |
| 7,563,228 B2 * | 7/2009 | Ma et al. | 600/437 |
| 2005/0052750 A1 | 3/2005 | King et al. | |
| 2005/0140634 A1 * | 6/2005 | Takatori | 345/96 |
| 2005/0276071 A1 | 12/2005 | Sasagawa et al. | |
| 2006/0132673 A1 | 6/2006 | Ito et al. | |
| 2007/0008406 A1 | 1/2007 | Shestak et al. | |
| 2007/0024802 A1 * | 2/2007 | Kwon | 349/177 |
| 2007/0182730 A1 * | 8/2007 | Mashitani et al. | 345/419 |
| 2007/0236617 A1 * | 10/2007 | Lippey | 349/5 |
| 2007/0247477 A1 * | 10/2007 | Lowry et al. | 345/629 |
| 2008/0036853 A1 * | 2/2008 | Shestak et al. | 348/51 |
| 2008/0062259 A1 * | 3/2008 | Lipton et al. | 348/58 |
| 2009/0051759 A1 * | 2/2009 | Adkins et al. | 348/53 |

FOREIGN PATENT DOCUMENTS

| | | |
|---|---|---|
| EP | 1 775 623 | 4/2007 |
| JP | 2005-292722 | 10/2005 |

OTHER PUBLICATIONS

Woods et al., "The Use of Flicker-free Television Products for Stereoscopic Display Applications", Proceeding of SPIE vol. 1457, p. 322-326, Feb. 25-27, 1991.
Tanaka et al., "Fast Response and High Contract OCB Display Using LED Backlight and Novel Driving Scheme", IDS '06, p. 643-646.
Ishikawa et al. "New Design for a Highly Collimating Turning Film," Eastman Kodak Company, SID 06 Digest, p. 514-517, 2006.

\* cited by examiner

*Primary Examiner* — Dustin Nguyen

(57) ABSTRACT

A display apparatus includes an autosteroscopic liquid crystal display panel having a frame response time of less than 10 milliseconds, and a backlight positioned to provide light to the autosteroscopic liquid crystal display. The backlight includes a right eye solid state light source and a left eye solid state light source capable of being modulated between the right eye solid state light source and a left eye solid state light source at a rate of at least 90 Hertz.

14 Claims, 2 Drawing Sheets

AUTOSTEREOSCOPIC LIQUID CRYSTAL DISPLAY APPARATUS

FIELD

The present disclosure relates to an autosteroscopic liquid crystal display apparatus and particularly to an autosteroscopic liquid crystal display apparatus that shows flicker-free video and rendered computer graphics.

BACKGROUND

An autosteroscopic or 3D display usually presents an observer with images with parallax from individual right and left eye viewpoints. In one method of an autostereoscopic display, right eye and left eye viewpoints are alternatively displayed. The method of displaying alternating left eye and right eye images in a temporally controlled left, right, left, right, . . . sequence, at a sufficiently high frame rate to produce an essentially flicker-free 3D image is know for CRT displays and 3D glasses and is commercially available from, for example, eDimensional and CrystalEyes.

Previously known techniques of flicker-free operation for an autostereoscopic liquid crystal display (i.e., LCD) specify a relatively slow speed image sequence, for example, 24 frames per second and achieve visually flicker-free operation by displaying the autostereoscopic image pairs more than twice. These known techniques also incorporate a method of improving the response time of the LCD panel teaching gradation value conversion and/or feed-forward drive compensation.

BRIEF SUMMARY

The present disclosure relates to an autosteroscopic liquid crystal display apparatus and particularly to an autostereoscopic liquid crystal display apparatus that displays flicker-free video and rendered computer graphics.

In a first embodiment, a display apparatus includes an autosteroscopic liquid crystal display panel having a frame response time of less than 10 milliseconds, and a backlight positioned to provide light to the autosteroscopic liquid crystal display panel. The backlight includes a right eye solid state light source and a left eye solid state light source capable of being modulated between the right eye solid state light source and a left eye solid state light source at a rate of at least 90 Hertz.

In another embodiment, a method of displaying flicker-free rendered computer graphics includes providing rendered computer graphics to an autosteroscopic liquid crystal display at a rate of at least 90 unique image frames per second, and displaying the rendered computer graphics on the autosteroscopic liquid crystal display. The autosteroscopic liquid crystal display has a frame response time of less than 10 milliseconds.

In a further embodiment, a method of displaying flicker-free video includes providing video to an autosteroscopic liquid crystal display at a rate of at least 90 frames per second, and displaying the video on the autosteroscopic liquid crystal display. The autosteroscopic liquid crystal display has a frame response time of less than 10 milliseconds.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
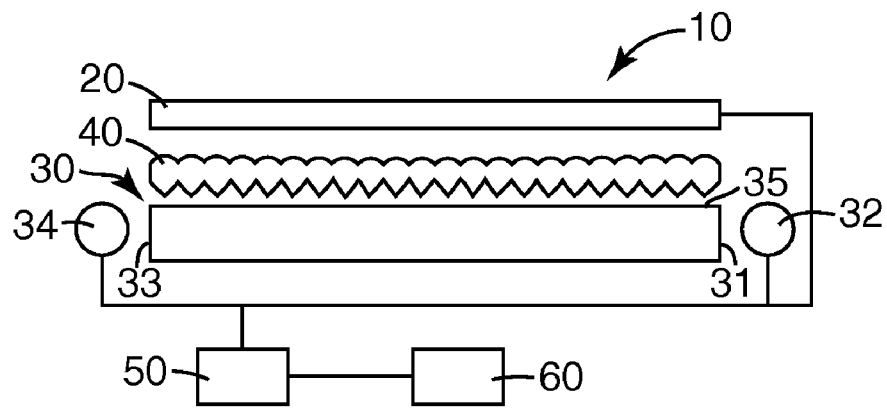
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

The term "autostereoscopic" refers to displaying three-dimensional images that can be viewed without the use of special headgear or glasses on the part of the user or viewer. These methods produce depth perception in the viewer even though the image is produced by a flat device.

The term "flicker-free" refers to a perceptible image discontinuity and usually occurs when images are displayed at a frame or image pair rate for autostereoscopic image pairs of 45 Hertz or less.

The present disclosure relates to an autosteroscopic liquid crystal display apparatus and particularly to an autostereoscopic liquid crystal display apparatus that displays flicker-free video and rendered computer graphics. The autosteroscopic liquid crystal display has a frame response time of less than 10 milliseconds and can display image frames at a rate of at least 90 frames per second. Computer rendered image frames can be displayed at a rate of at least 90 unique frames per second and video image frames can be displayed at a rate of at least 90 unique frames per second. The apparatus and methods described herein provides flicker-free 3D autostereoscopic viewing without the complexity of gradation value conversion or feed-forward compensation or the need for image compression and/or decoding. The current disclosure utilizes commercial computer hardware, software, and/or memory and fast response time LCD panels to display flicker-free autostereoscopic 3D video or computer rendered graphics. While the present invention is not so limited, an appreciation of various aspects of the invention will be gained through a discussion of the examples provided below.

A liquid crystal display is a sample and hold display device such that the images at any particular point are stable until that point is updated at the next image refresh time, typically 1/60 of a second or faster. In such a sample and hold system, displaying different images, specifically alternating left and right images for an autostereoscopic 3D display, during sequential refresh periods of the display requires careful sequencing of the light sources so that, for example, the left eye light source is not on during the display of data for the right eye and vice versa. Separate light guides for left eye and right eye light sources are described in United States Patent Application Publication No. 2005/276071, which is incorporated by reference herein). This reference utilizes a double-sided prism film having vertically aligned features that are aligned with extraction features on a light guide plate and normal to the light propagation direction of the light guide to better than 5 degrees or better than 1 degree.

Previously known techniques of visually flicker-free operation for autostereoscopic display (described in U.S. Pat. No. 6,816,142 and United States Patent Application Publication Nos. 2005/276071 and 2006/0132673, which are incorporated by reference herein) specify a relatively slow speed image sequence such as, for example, 24 frames per second, and teach that visually flicker-free operation requires displaying the autostereoscopic image pairs a constant number of times and always being more than two times. These techniques require a method of improving the response rate of an LCD panel and teach gradation value conversion and/or feed-forward drive compensation. Autostereoscopic displays that utilize gradation value conversion and/or feed-forward drive compensation are described in: U.S. Pat. Nos. 6,825,821; 7,057,638; 6,816,142; 7,015,887, which are incorporated by reference herein.

FIG. 1 is a schematic side view of an illustrative display apparatus 10. The display apparatus includes an autostereoscopic liquid crystal display panel 20 having a frame response time of less than 10 milliseconds, or less than 5 milliseconds, and a backlight 30 positioned to provide light to the autostereoscopic liquid crystal display panel 20. The backlight 30 includes a right eye solid state light source 32 and a left eye solid state light source 34 capable of being modulated between the right eye solid state light source 32 and the left eye solid state light source 34 at a rate of at least 90 Hertz. A double sided prism film 40 is disposed between the autostereoscopic liquid crystal display panel 20 and the backlight 30 and in registration with any extraction features on the backlight, as described above.

A synchronization driving element 50 is electrically connected to the backlight 30 light sources 32, 34 and the liquid crystal display panel 20. The synchronization driving element 50 synchronizes activation and deactivation (i.e., modulation) of the right eye solid state light source 32 and the left eye solid state light source 34 as image frames are provided at a rate of 90 frames per second or greater to the autostereoscopic liquid crystal display panel 20 to produce a flicker-free video or rendered computer graphics. An image (i.e., video or computer rendered graphics) source 60 is connected to the synchronization driving element 50 and provides the images frames (e.g., right eye images and left eye images) to the liquid crystal display panel 20.

The autostereoscopic liquid crystal display panel 20 can be any transmissive liquid crystal display panel that has a frame response time of less than 10 milliseconds, or less than 5 milliseconds. Commercially available transmissive liquid crystal display panels having a frame response time of less than 10 milliseconds, or less than 5 milliseconds include HannStar's HSD190ME13 (HannStar Display Corporation, Taiwan) and Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye solid state light source 32 and left eye solid state light source 34 at a rate of at least 90 Hertz, or 100 Hertz, or 110 Hertz, or 120 Hertz, or greater than 120 Hertz. The illustrated backlight 30 includes a first light input end 31 adjacent to the right eye solid state light source 32 and an opposing second light input end 33 adjacent to the left eye solid state light source 34 and a light output surface 35. The solid state light sources can be any useful solid state light source that can be modulated at a rate of at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as white, red, blue, and/or green.

The double sided prism film 40 can be any useful prism film having a lenticular structure on a first side and a prismatic structure on an opposing side. The double sided prism film 40 transmits light from the backlight to the liquid crystal display panel 20 at the proper angles such that a viewer perceives depth in the displayed image. Useful, double sided prism films are described in United States Patent Publication Nos. 2005/0052750 and 2005/0276071, which are incorporated by reference herein.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200, 7900 GO GS, or 7950GX graphics card. The computer rendered graphic source can also incorporate stereo driver software such as, for example, an OpenGL, DirectX, or an Nvidia proprietary stereo driver.

The video source can provide video content. The video source can include a graphics processing unit such as, for example, a Quadro FX1400 graphics card. The computer rendered graphic source can also include a stereo driver such as, for example, an OpenGL or DirectX stereo driver.

The synchronization driving element 50 can include any useful driving element providing synchronizing activation and deactivation (i.e., modulation) of the right eye solid state light source 32 and the left eye solid state light source 34 with image frames provided at a rate of 90 frames per second or greater to the autostereoscopic liquid crystal display panel 20 to produce a flicker-free video or rendered computer graphics. The synchronization driving element 50 can include a video interface such as, for example, a Westar VP-7 video adaptor (Westar Display Technologies, Inc., Missouri) coupled to custom solid state light source drive electronics.

Figure 2A:
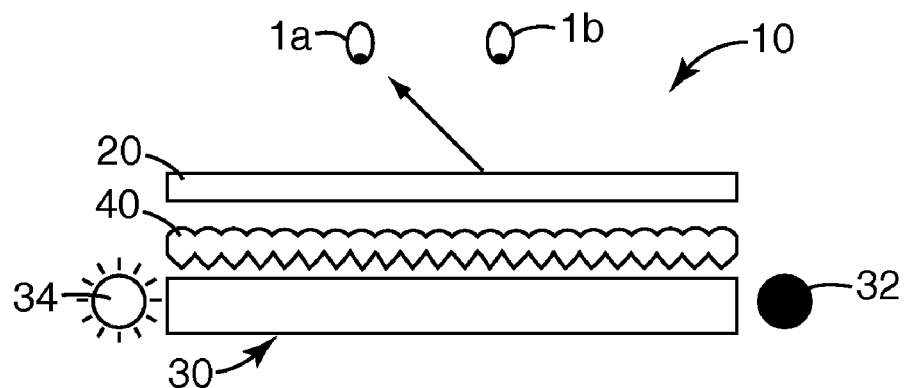
FIG. 2A and FIG. 2B are schematic side views of an illustrative display apparatus in operation.
Figure 2B:
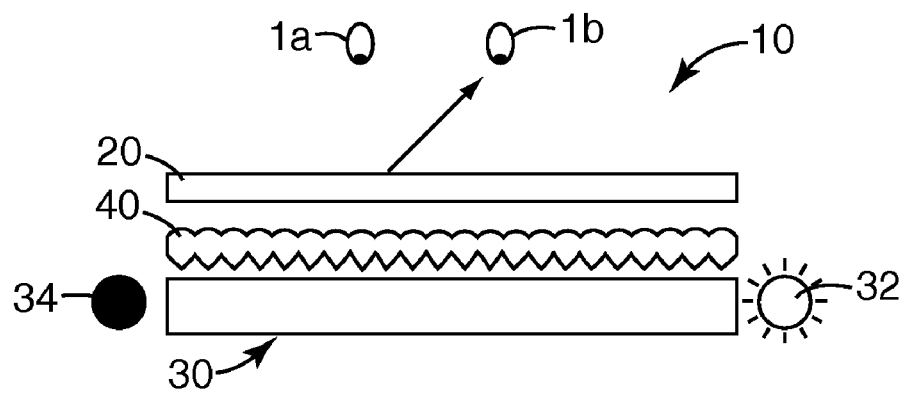

FIG. 2A and FIG. 2B are schematic side views of an illustrative display apparatus 10 in operation. In FIG. 2A the left eye solid state light source 34 is illuminated and the right eye solid state light source 32 is not illuminated. In this state, the light emitted from the left eye solid state light source 34 transmits through the backlight 30, through the double sided prism sheet 40, and liquid crystal panel 20 providing a left eye image directed toward the left eye 1a of an viewer or observer. In FIG. 2B the right eye solid state light source 32 is illuminated and the left eye solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1b of an viewer or observer.

Providing at least 45 left eye images and at least 45 right eye images (alternating between right eye and left eye images) to a viewer per second provides a flicker-free 3D image to the viewer. Accordingly, displaying different images (right eye and left eye images) alternating in synchronization with the switching of the light sources 32 and 34 enables the viewer to visually fuse the two different images, creating the perception of depth from the flat panel display.

Figure 3:
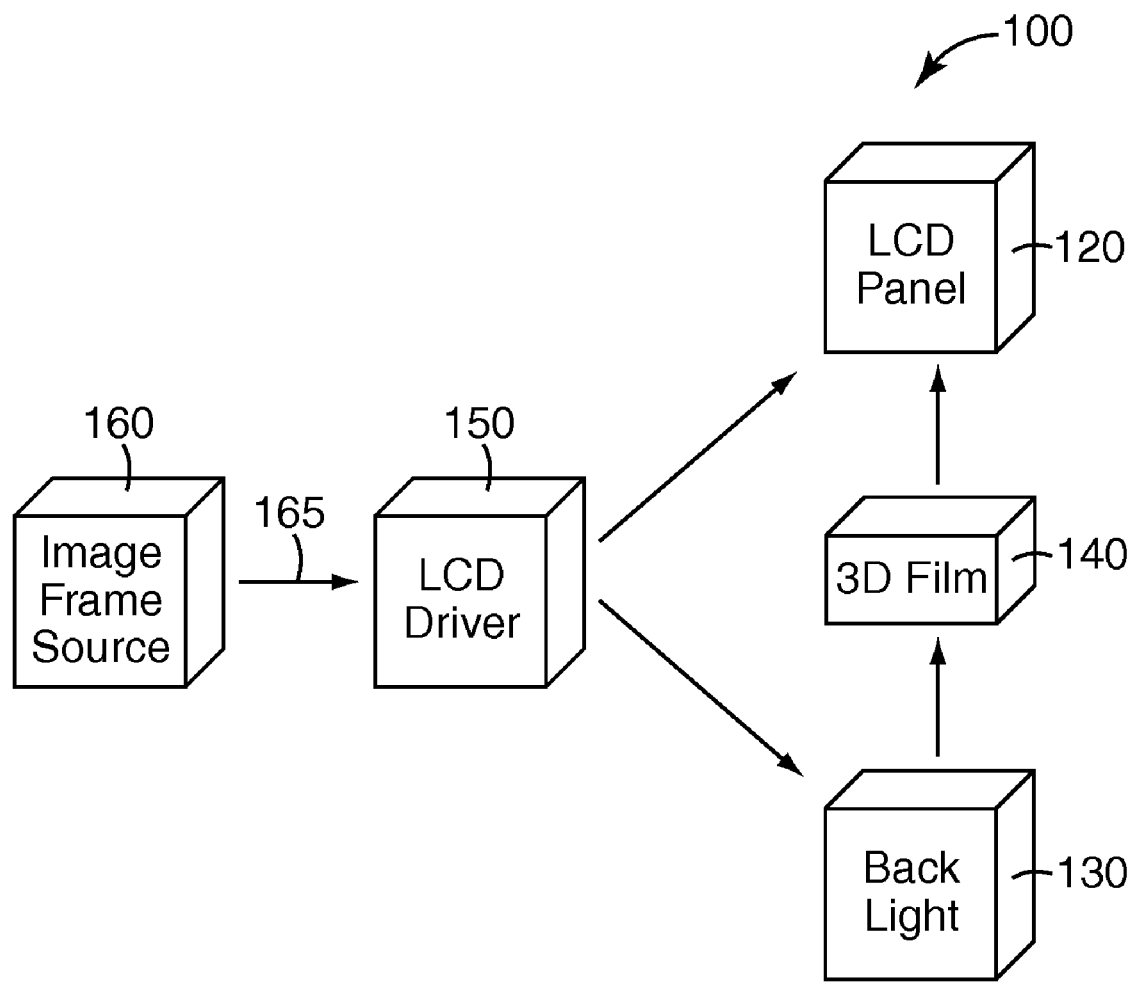
FIG. 3 is a schematic block diagram an illustrative display apparatus.

FIG. 3 is a schematic block diagram an illustrative display apparatus 100. The display apparatus 100 includes an autosteroscopic liquid crystal display panel 120 having a frame response time of less than 10 milliseconds, or less than 5 milliseconds and a backlight 130 positioned to provide light to the autosteroscopic liquid crystal display panel 120. A double sided prism film 140 is disposed between the autosteroscopic liquid crystal display panel 120 and the backlight 130. A synchronization driving element 150 is electrically connected to the backlight 130 and the liquid crystal display panel 120. The synchronization driving element 150 synchronizes activation and deactivation (i.e., modulation) of the right eye solid state light source and the left eye solid state light source with image frames provided at a rate of 90 frames per second or greater to the autosteroscopic liquid crystal display panel 120 to produce a flicker-free video or rendered computer graphics. An image (i.e., video or computer rendered graphics) source 160 is connected to the synchronization driving element 150 and provides the images frames (e.g., right eye images and left eye images) to the liquid crystal display panel 120.

The computer rendered graphic source 160 can provide image frames from 90 to 120 Hertz or greater. This image frame stream 165 consists of a plurality of image frames alternating between left eye (L) and right eye (R) images. For example, the image frame stream 165 provides a stream of image frames as follows: $L_1, R_1, L_2, R_2, L_3, R_3, L_4, R_4 \ldots$. Thus, at least 45 unique right eye image frames per second and at least 45 unique left eye image frames per second are provided by the computer rendered graphic source 160 and displayed by the liquid crystal display panel 120. In some embodiments, at least 50 unique right eye image frames per second and at least 50 unique left eye image frames per second are provided by the computer rendered graphic source 160 and displayed by the liquid crystal display panel 120. In some embodiments, at least 60 unique right eye image frames per second and at least 60 unique left eye image frames per second are provided by the computer rendered graphic source 160 and displayed by the liquid crystal display panel 120.

The computer rendered graphic source 160 provides a stream of unique image frames as follows: $L_1, R_1, L_2, R_2, L_3, R_3, L_4, R_4 \ldots$ at the LCD panel display rate. For example, an Nvidia FX5200 GPU requires no additional image or video processing. The rendering software, e.g., Nvidia stereo driver software and a computer game, e.g., LEGO™ Star Wars, for the case of a PC with a Nvidia FX5200 card, simply runs fast enough to create the required $L_1, R_1, L_2, R_2, L_3, R_3, L_4, R_4 \ldots$ image sequence at an image frame rate of 90 to 120 Hertz or greater, frames per second (i.e., Hertz).

The video source 160 can provide image frames from 90 to 120 Hertz or greater or at two times standard video frame rate speed. This image frame stream 165 consists of a plurality of image frames alternating between left eye (L) and right eye (R) images. For example, the image frame stream 165 provides a stream of image frames as follows: $L_1, R_1, L_1, R_1, L_2, R_2, L_2, R_2 \ldots$. Thus, at least 25 unique right eye image frames per second and at least 25 unique left eye image frames per second are provided by the video source 160 and displayed by the liquid crystal display panel 120. In some embodiments, at least 30 unique right eye image frames per second and at least 30 unique left eye image frames per second are provided by the video source 160 and displayed by the liquid crystal display panel 120.

The video source 160 initial $L_1, R_1, L_2, R_2 \ldots$ video stream at 60 Hertz is replicated in the software without requiring specialized image processing beyond synchronization with the video drive signal. If the software is written to synchronize the image frame stream 165 to the video drive frequency, for example 100 Hertz, only image pairs (e.g., $L_1, R_1, L_1, R_1, L_2, R_2, L_2, R_2, L_3, R_3, L_4, R_4, L_4, R_4 \ldots$) are output, never just a single left or right image, thus preserving the synchronization with the backlight drive electronics and the autosteroscopic perception of the displayed video sequence. As shown above, the software can insert image pairs into the image frame stream one ($L_3, R_3$), two (., $L_1, R_1, L_1, R_1, L_2$), three times, or more as needed to synchronize the image frame stream 165 to the video drive frequency. In other words, the software can display a non-constant number of image pairs to account for a display rate that is a non-integer multiple of the image frame input rate. Thus with proper software synchronization and software stereo driver operation, the output display rate does not have to be an integral multiple of the video input rate (e.g., 60 Hertz). The software synchronization process will correctly display even non-integer ratios, e.g., 60 Hertz input to 100 Hertz output, or 60 Hertz input to 90 Hertz output, or 60 Hertz input to 110 Hertz output.

Thus, embodiments of the AUTOSTEREOSCOPIC LIQUID CRYSTAL DISPLAY APPARATUS are disclosed. One skilled in the art will appreciate that the present invention can be practiced with embodiments other than those disclosed. The disclosed embodiments are presented for purposes of illustration and not limitation, and the present invention is limited only by the claims that follow and their equivalents.

What is claimed is:

1. A method of displaying flicker-free rendered computer graphics, comprising:
   providing rendered computer graphics to an autosteroscopic liquid crystal display at a rate of at least 45 unique right eye image frames per second and at least 45 unique left eye image frames per second; and
   displaying the rendered computer graphics on the autosteroscopic liquid crystal display, the autosteroscopic liquid crystal display having a frame response time of less than 10 milliseconds.

2. A method according to claim 1, wherein the autosteroscopic liquid crystal display comprises:
   a liquid crystal display panel having a frame response time of less than 10 milliseconds;
   a backlight positioned to provide light to the autosteroscopic liquid crystal display panel, the backlight comprising a right eye solid state light source and a left eye solid state light source capable of being modulated between the right eye solid state light source and a left eye solid state light source at a rate of at least 90 Hertz; and a double sided prism film disposed between the liquid crystal display panel and the backlight.

3. A method according to claim 1, wherein the providing step comprises providing rendered computer graphics to an autosteroscopic liquid crystal display at a rate of at least 50 unique right eye image frames per second and at least 50 unique left eye image frames per second.

4. A method according to claim 1, wherein the providing step comprises providing rendered computer graphics to an autosteroscopic liquid crystal display at a rate of at least 60 unique right eye image frames per second and at least 60 unique left eye image frames per second.

5. A method according to claim 1, wherein the displaying step further comprises synchronizing modulation of a right eye solid state light source and a left eye solid state light source with the image frames.

6. A method according to claim 5, wherein the displaying step comprises synchronizing modulation of a right eye solid state light source and a left eye solid state light source with alternating right eye image frames and left eye image frames.

7. A method according to claim 1, wherein the displaying step comprises displaying the rendered computer graphics on the autosteroscopic liquid crystal display, the autosteroscopic liquid crystal display having a frame response time of less than 5 milliseconds.

8. A method of displaying flicker-free video, comprising:
    providing video to an autosteroscopic liquid crystal display at a rate of at least 90 frames per second and the video comprises at least 25 unique right eye image frames per second and at least 25 unique left eye image frames per second; and
    displaying the video on the autosteroscopic liquid crystal display, the autosteroscopic liquid crystal display having a frame response time of less than 10 milliseconds.

9. A method according to claim 8, wherein the autosteroscopic liquid crystal display comprises:
    a liquid crystal display panel having a frame response time of less than 10 milliseconds;
    a backlight positioned to provide light to the autosteroscopic liquid crystal display panel, the backlight comprising a right eye solid state light source and a left eye solid state light source capable of being modulated between the right eye solid state light source and a left eye solid state light source at a rate of at least 90 Hertz; and
    a double sided prism film disposed between the liquid crystal display panel and the backlight.

10. A method according to claim 8, wherein the providing step comprises providing video to an autosteroscopic liquid crystal display at a rate of at least 30 unique right eye image frames per second and at least 30 unique left eye image frames per second.

11. A method according to claim 8, wherein the displaying step further comprises synchronizing modulation of a right eye solid state light source and a left eye solid state light source with the image frames.

12. A method according to claim 11, wherein the displaying step comprises synchronizing modulation of a right eye solid state light source and a left eye solid state light source with alternating right eye image frames and left eye image frames.

13. A method according to claim 8, wherein the displaying step comprises displaying the video on the autosteroscopic liquid crystal display, the autosteroscopic liquid crystal display having a frame response time of less than 5 milliseconds.

14. A method according to claim 8, wherein the providing step comprises providing a non-constant number of right and left eye video frame pairs to the autosteroscopic liquid crystal display.

* * * * *

UNITED STATES PATENT AND TRADEMARK OFFICE
CERTIFICATE OF CORRECTION

PATENT NO. : 8,339,444 B2  
APPLICATION NO. : 11/697870  
DATED : December 25, 2012  
INVENTOR(S) : John C Schultz Page 1 of 2

It is certified that error appears in the above-identified patent and that said Letters Patent is hereby corrected as shown below:

Title Page, Column 2
Line 1, Delete "autosteroscopic" and insert -- autostereoscopic --, therefor.
Line 4, Delete "autosteroscopic" and insert -- autostereoscopic --, therefor.

In the Specifications:
Column 1
Line 6, Delete "autosteroscopic" and insert -- autostereoscopic --, therefor.
Line 7-8, Delete "autosteroscopic" and insert -- autostereoscopic --, therefor.
Line 12, Delete "autosteroscopic" and insert -- autostereoscopic --, therefor.
Line 19, Delete "autosteroscopic" and insert -- autostereoscopic --, therefor.
Line 23, Delete "autosteroscopic" and insert -- autostereoscopic --, therefor.
Line 34, Delete "autosteroscopic" and insert -- autostereoscopic --, therefor.
Line 39, Delete "autosteroscopic" and insert -- autostereoscopic --, therefor.
Line 41, Delete "autosteroscopic" and insert -- autostereoscopic --, therefor.
Line 49, Delete "autosteroscopic" and insert -- autostereoscopic --, therefor.
Line 51-52, Delete "autosteroscopic" and insert -- autostereoscopic --, therefor.
Line 52, Delete "autosteroscopic" and insert -- autostereoscopic --, therefor.
Line 56, Delete "autosteroscopic" and insert -- autostereoscopic --, therefor.
Line 58, Delete "autosteroscopic" and insert -- autostereoscopic --, therefor.
Line 59, Delete "autosteroscopic" and insert -- autostereoscopic --, therefor.

Column 2
Line 53, Delete "autosteroscopic" and insert -- autostereoscopic --, therefor.
Line 56-57, Delete "autosteroscopic" and insert -- autostereoscopic --, therefor.

Column 3
Line 40-41, Delete "autosteroscopic" and insert -- autostereoscopic --, therefor.
Line 43-44, Delete "autosteroscopic" and insert -- autostereoscopic --, therefor.
Line 49-50, Delete "autosteroscopic" and insert -- autostereoscopic --, therefor.

Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,339,444 B2

Column 3
Line 59, Delete "autosteroscopic" and insert -- autostereoscopic --, therefor.
Line 66, Delete "autosteroscopic" and insert -- autostereoscopic --, therefor.

Column 4
Line 62, Delete "autosteroscopic" and insert -- autostereoscopic --, therefor.

Column 5
Line 25-26, Delete "autosteroscopic" and insert -- autostereoscopic --, therefor.
Line 29, Delete "autosteroscopic" and insert -- autostereoscopic --, therefor.
Line 30-31, Delete "autosteroscopic" and insert -- autostereoscopic --, therefor.
Line 38, Delete "autosteroscopic" and insert -- autostereoscopic --, therefor.

Column 6
Line 27, Delete "thus" and insert -- thus, --, therefor.
Line 28-29, Delete "autosteroscopic" and insert -- autostereoscopic --, therefor.

In the Claims:
Line 53-54, In Claim 1, Delete "autosteroscopic" and insert -- autostereoscopic --, therefor.
Line 57-58, In Claim 1, Delete "autosteroscopic" and insert -- autostereoscopic --, therefor.
Line 58, In Claim 1, Delete "autosteroscopic" and insert -- autostereoscopic --, therefor.

Column 7
Line 8, In Claim 3, Delete "autosteroscopic" and insert -- autostereoscopic --, therefor.
Line 13, In Claim 4, Delete "autosteroscopic" and insert -- autostereoscopic --, therefor.
Line 27, in Claim 7, Delete "autosteroscopic" and insert -- autostereoscopic --, therefor.
Line 27, In Claim 7, Delete "autosteroscopic" and insert -- autostereoscopic --, therefor.
Line 30, In Claim 8, Delete "autosteroscopic" and insert -- autostereoscopic --, therefor.
Line 36, In Claim 8, Delete "autosteroscopic" and insert -- autostereoscopic --, therefor.
Line 37, In Claim 8, Delete "autosteroscopic" and insert -- autostereoscopic --, therefor.

Column 8
Line 15, In Claim 10, Delete "autosteroscopic" and insert -- autostereoscopic --, therefor.
Line 29, In Claim 13, Delete "autosteroscopic" and insert -- autostereoscopic --, therefor.
Line 30, In Claim 13, Delete "autosteroscopic" and insert -- autostereoscopic --, therefor.